Jan. 16, 1968  F. H. KREUGER  3,364,420
SCANNING APPARATUS INCLUDING FLUENT MATERIAL ELECTRODE
MEANS FOR DETECTING IMPERFECTIONS IN THE INSULATION
OF CABLES HAVING AN OUTER SEMI-CONDUCTIVE SHEATH
Filed April 12, 1966
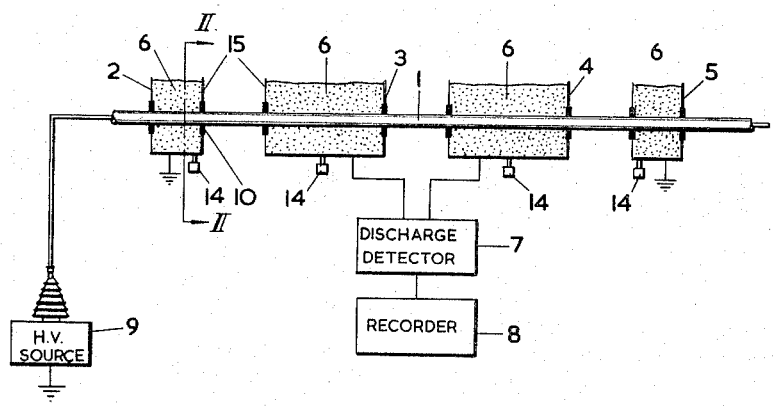
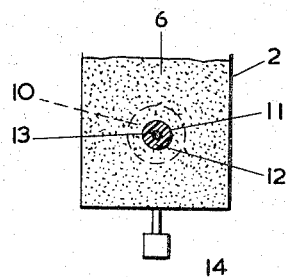

United States Patent Office 3,364,420
Patented Jan. 16, 1968

3,364,420
SCANNING APPARATUS INCLUDING FLUENT MATERIAL ELECTRODE MEANS FOR DETECTING IMPERFECTIONS IN THE INSULATION OF CABLES HAVING AN OUTER SEMI-CONDUCTIVE SHEATH
Frederik Hendrik Kreuger, Delft, Netherlands, assignor to N.V. Nederlandsche Kabelfabrieken, Delft, Netherlands
Filed Apr. 12, 1966, Ser. No. 541,985
Claims priority, application Netherlands, July 7, 1965, 65—8,742
5 Claims. (Cl. 324—54)

ABSTRACT OF THE DISCLOSURE

A scanning apparatus for detecting voids or other imperfections in the electrical insulation surrounding the conductor core of an electrical cable having an outermost sheath of semi-conducting material, said apparatus comprising a plurality of electrically conductive containers each holding a mass of fluent electrically conductive material whereby the cable to be scanned can pass in a straight line successively through said fluent material in each container, certain ones of said containers being electrically grounded and others being connected to an electrical measuring and recording device, and further comprising a voltage source for energizing the cable core as it passes through the fluent material.

---

The present invention relates to an improved apparatus whose purpose is to detect voids or other imperfections in the electrical insulation surrounding the conductor core of a cable which further comprises an outermost sheath of semi-conducting material.

Apparatus of this general type is already known, such as, for example, that disclosed in "Scanning of Screened Plastic Cores for Discharges," by F. H. Krueger in the Proceedings of the Institute of Electrical Engineers, volume 109, Part A, Suppl. 3, 1962, page 129.

The known apparatus, in general, comprises a frame upon which are rotatably mounted four rolls of elecrtically conductive material, the axes of said rolls generally being parallel to each other. A cable, whose insulation is to be scanned, is successively passed over each of the four rolls so that the cable outermost sheath, which is semi-conductive, contacts the periphery of each roll. The endmost rolls are electrically grounded while the two intermediate rolls are connected to a discharge detector. The cable core is connected to a source of high voltage and is energized thereby while being passed over the rotating rolls. Any imperfections in the cable insulation will result in a corresponding voltage discharge from the cable core through the intermediate rolls, which are of conductive material, and into the discharge detector which will reveal such imperfections in the form of a corresponding discharge signal. The discharge signal is continuously recorded in a manner whereby any portion of the signal can be correlated to the corresponding cable portion from which that signal came.

A disadvantage of the aforedescribed known type of scanning apparatus is that it is impractical to scan cables whose cross-sectional areas exceed certain maximum limits, since in the known type apparatus the cable carrying rolls are sized proportionally to the cable core size because the minimum bending radius of said core is proportional to the core size. Commercially practicable apparatus of the known type are suitable for scanning cable having a core cross-section of up to about 95 mm.$^2$.

An object of the present invention, therefore, is to provide a cable scanning apparatus which is practicable for scanning any size of cable of the type having an outermost semi-conductive sheath and wherein the apparatus is of relatively compact size and wherein said size is substantially independent of the size of cable which is being scanned.

A further object of this invention is to provide a cable scanning apparatus in which the noise level during operation is considerably reduced relative to known apparatus.

The above-stated objects are generally realized by providing a scanning apparatus wherein the cable may be advanced in a straight line through a generally fluent electrically conductive material, rather than over a rigid, curved surface such as the curved rolls of known scanning apparatus.

The following is a detailed description of a preferred embodiment of the present invention and is referred to the appended drawing, wherein:

FIGURE 1 is a schematic front elevation view of the apparatus of this invention; and, FIGURE 2 is side sectional view taken along line II—II of FIGURE 1.

With reference to the drawing, the cable 1, comprising a conductive core 13, surrounded respectively by insulation 12 and semi-conductive sheath 11, is advanced lengthwise from left to right (in FIGURE 1) through the scanning apparatus. The apparatus comprises four electrically conductive containers 2, 3, 4, and 5, respectively aligned in longitudinal succession, each container being provided with vertical end walls 15 within each of which there is an opening and an associated sealing means 10 which provides for the passage of cable 1 therethrough. Each container 2 to 5 is filled with powdered graphite or some other suitable fluent conductive material, and the sealing means 10 are such as to prevent the graphite from spilling out of the chambers while the cable is being advanced therethrough.

The sealing means 10 may comprise any known sealing means which is suitable for the above indicated purpose. For example, the means 10 may comprise a resilient ring which will automatically conform itself to the outer periphery of the cable 1. A particular sized ring may have such a resiliency that it can be used for cables of different sizes within a particular range of sizes. The ring may be replaceable with a different sized ring to accommodate different sizes of cables.

The sealing means 10 may in turn comprise means for closing off the openings in the end walls 15 when there is no cable 1 at all in the apparatus.

Each container 2–5 includes a means 14 for vibrating the containers and thereby maintaining the powdered graphite in a substantially fluent condition whereby it fills all voids in the containers. In this regard, it should be noted that the passage of the cable 1 through a substantially fluent conductive mass 6 incurs a minimum noise level which is considerably below the noise level incurred in known scanning apparatus wherein the cable is passed over a solid surface roll.

Referring to FIGURE 1, it is seen that the end containers 2 and 5, are each electrically grounded while the intermediate containers 3 and 4 are each electrically connected to a discharge detector 7 which in turn is connected to recorder 8. The cable core 13 is electrically connected to a source of high voltage 9.

The operation of the apparatus is as follows in order to determine the location of voids or other defects in the insulation 12 along the length of electrical cable 1.

The cable is advanced by any known means from left to right successively through the containers 2 to 5. Simultaneously, the cable core 13 is energized by means of high voltage source 9, and vibrators 14 maintain the conductive mass 6 in each container in a fluent condition.

Since no insulating material is an absolute non-conductor, there will normally occur a very small voltage discharge from cable core 13, through insulation 12 and sheath 11, into conductive mass 6, and then to the respective container walls and to the detector 7 which will send a corresponding output signal to recorder 8. If the insulation 12 were uniform and free of all defects, this voltage discharge would remain below a certain level and be substantially constant, and this would be reflected in a correspondingly constant signal being recorded at 8; however, if insulation 12 were to have voids therein or other defects, the voltage discharge from core 13 to detector 7 would correspondingly fluctuate as the defective portion of insulation passed through containers 3 and 4 and this also would be reflected in the signal recorded at 8. The signal is recorded at 8 in a manner whereby it is synchronized with the cable as it passes through the containers so that the voltage discharge as indicated in the signal can be referred back to the specific location on the cable at which that discharge occurred.

A cause of inaccurate readings in the known apparatus resides in the fact that mechanical or physical disturbances occur between the cable and the rolls because the rolling contact between them is not very smooth and uniform, this being caused by the fact that the sheath 11 has a relatively rough surface. On the other hand, this factor does not present itself in the present invention since the cable passes through a relatively fluent conductive mass 6 so that irregularities or roughness in the sheath 11 is compensated for by the fluent characteristics of the mass 6.

The apparatus of this invention can be located in a well ventilated room in the event that the fluent mass 6 has a tendency to escape from the respective containers 2 to 5 and thereby contaminate the ambient air.

It is to be understood that the foregoing detailed description refers only to a preferred embodiment of the present invention and that the invention is susceptible to realizations employing modifications, variations, or obvious equivalents of the elements specifically disclosed herein.

What is claimed is:

1. A scanning apparatus for measuring voltage discharge along the length of an electrical cable having a conductor core surrounded by a layer of insulating material which in turn is wrapped in a semi-conductive sheath, comprising: four electrically conductive containers arranged serially with respect to one another, said containers each holding a mass of fluent electrically conductive material, said containers providing a substantially straight line path for a cable to pass successively through said fluent material in each of said containers, the two endmost containers being electrically grounded and the two intermediate containers being electrically connected to an electrical measuring and recording device, and a voltage source for energizing the core of an electrical cable passing through said containers, said voltage source being adapted to be connected to said core with one terminal thereof, the other terminal being connected to ground.

2. The apparatus of claim 1, wherein said fluent mass is powdered graphite.

3. The apparatus of claim 1, including a means to vibrate each of said containers.

4. The apparatus of claim 1, wherein each of said containers includes opposed vertical walls having aligned openings therein, sealing means in each of said openings, said sealing means being adapted to permit a cable to pass therethrough while preventing said fluent mass from flowing out thereof.

5. The apparatus of claim 1, wherein said measuring and recording device includes a means to continuously record the voltage signal from said intermediate containers.

References Cited

UNITED STATES PATENTS

| | | | |
|---|---|---|---|
| 1,897,330 | 2/1933 | Pender | 324—62 |
| 2,360,944 | 10/1944 | Fruth | 324—54 X |
| 2,882,491 | 4/1959 | Gooding | 324—54 |
| 2,900,597 | 8/1959 | Gooding | 324—54 |
| 3,134,071 | 5/1964 | Wakefield | 324—54 |
| 3,229,199 | 1/1966 | Mildner | 324—54 |

OTHER REFERENCES

Kreuger: "Scanning of Screened Plastic Cores For Discharges," The Institution of Electrical Engineers Paper No. 3904M June, 1962, pp. 129–133.

RUDOLPH V. ROLINEC, *Primary Examiner.*

ARCHIE R. BORCHELT, *Examiner.*

G. R. STRECKER, *Assistant Examiner.*